(12) United States Patent
Tiwari et al.

(10) Patent No.: US 10,831,162 B2
(45) Date of Patent: Nov. 10, 2020

(54) SYSTEMS AND METHODS FOR PROVIDING AN INTEGRATED POWER PLANT ADVISOR

(71) Applicant: General Electric Company, Schenectady, NY (US)

(72) Inventors: Awadesh Kumar Tiwari, Bangalore (IN); Kowta Ramshanker, Bangalore (IN); Xiaomo Jiang, Atlanta, GA (US); John Robert Korsedal, Greenville, SC (US); Shirish Kumar Pandey, Bangalore (IN)

(73) Assignee: General Electric Company, Schenectady, NY (US)

( * ) Notice: Subject to any disclaimer, the term of this patent is extended or adjusted under 35 U.S.C. 154(b) by 348 days.

(21) Appl. No.: 15/194,866

(22) Filed: Jun. 28, 2016

(65) Prior Publication Data

US 2017/0371305 A1    Dec. 28, 2017

(51) Int. Cl.
*G06F 11/30* (2006.01)
*G21C 17/00* (2006.01)
(Continued)

(52) U.S. Cl.
CPC ............... *G05B 9/02* (2013.01); *G06N 20/00* (2019.01); *G06Q 10/063* (2013.01); *G06Q 10/0635* (2013.01); *G06Q 50/06* (2013.01)

(58) Field of Classification Search
CPC ...... G05B 9/02; G06N 99/005; G06Q 10/063; G06Q 10/0635; G06Q 50/06
(Continued)

(56) References Cited

U.S. PATENT DOCUMENTS

2012/0283988 A1\* 11/2012 Pandey .................. G06Q 30/06
702/179
2013/0013255 A1\* 1/2013 Du ............................ F02K 1/00
702/183
(Continued)

FOREIGN PATENT DOCUMENTS

EP    2 521 083 A1    11/2012
EP    2 733 559 A2    5/2014
(Continued)

OTHER PUBLICATIONS

General Electric. Meridium: Different View of Asset Data. pp. 1-47.
(Continued)

*Primary Examiner* — Michael P Nghiem
(74) *Attorney, Agent, or Firm* — Eversheds Sutherland (US) LLP

(57) ABSTRACT

Embodiments of the disclosure can relate to providing an integrated power plant advisor. In one embodiment, a method for providing an integrated power plant advisor can include receiving a signal associated with a failure of a power plant or a power plant component. The method can further include determining one or more root causes associated with the failure of the power plant or the power plant component. Based at least in part on operational data and training data from one or more power plants, a ranking of the one or more root causes associated with the failure of the power plant or the power plant component can be determined. The method can further include outputting the ranking via a client device. Based at least in part on the ranking, a repair or replacement strategy for the power plant or the power plant component can be identified.

14 Claims, 7 Drawing Sheets

(51) Int. Cl.
  *G05B 9/02* (2006.01)
  *G06N 20/00* (2019.01)
  *G06Q 10/06* (2012.01)
  *G06Q 50/06* (2012.01)

(58) Field of Classification Search
  USPC .................................................. 702/184, 185
  See application file for complete search history.

(56) References Cited

U.S. PATENT DOCUMENTS

| | | | |
|---|---|---|---|
| 2014/0142766 A1* | 5/2014 | Tiwari | G05B 23/0272 |
| | | | 700/286 |
| 2014/0257526 A1* | 9/2014 | Tiwari | G05B 13/02 |
| | | | 700/29 |
| 2015/0058090 A1 | 2/2015 | Pandey et al. | |
| 2015/0330263 A1* | 11/2015 | Tiwari | F01K 23/101 |
| | | | 60/39.182 |
| 2015/0379422 A1* | 12/2015 | Chandler | G06N 20/00 |
| | | | 706/12 |
| 2016/0203036 A1* | 7/2016 | Mezic | G06F 11/079 |
| | | | 714/819 |
| 2016/0320768 A1* | 11/2016 | Zhao | G05B 19/406 |
| 2017/0023927 A1* | 1/2017 | Kaushal | G05B 19/4065 |
| 2017/0091617 A1* | 3/2017 | Baughman | G06N 3/0445 |
| 2018/0218277 A1* | 8/2018 | Korsedal | G06N 99/005 |
| 2019/0114574 A1* | 4/2019 | Greenawalt | G06Q 10/06311 |

FOREIGN PATENT DOCUMENTS

| | | |
|---|---|---|
| EP | 2 775 108 A2 | 9/2014 |
| EP | 2 947 530 A1 | 11/2015 |
| WO | 2013/006302 A2 | 1/2013 |

OTHER PUBLICATIONS

International Search Report and Written Opinion issued in connection with corresponding PCT Application No. PCT/US2017/38310 dated Oct. 10, 2017.

* cited by examiner

SYSTEMS AND METHODS FOR PROVIDING AN INTEGRATED POWER PLANT ADVISOR

TECHNICAL FIELD

This disclosure relates to power plants, and more particularly, to systems and methods for providing an integrated power plant advisor.

BACKGROUND OF THE DISCLOSURE

Industrial processes and power plants can have production losses due to volumetric downtime. Customers can spend a significant amount of time finding root causes of failures before trying to repair and/or replace process and power plant components.

BRIEF DESCRIPTION OF THE DISCLOSURE

Embodiments of the disclosure are generally directed to systems and methods for providing an integrated power plant advisor. According to one example embodiment of the disclosure, a method for providing an integrated power plant advisor can include receiving a signal associated with a failure of a power plant or a power plant component. The method can further include determining one or more root causes associated with the failure of the power plant or the power plant component. Based at least in part on operational data and training data from one or more power plants, a ranking of the one or more root causes associated with the failure of the power plant or the power plant component can be determined. The method can further include outputting the ranking via a client device. Based at least in part on the ranking, a repair or replacement strategy for the power plant or the power plant component can be identified.

According to another example embodiment of the disclosure, a system for an integrated power plant advisor can include a controller. The system can also include a memory with instructions executable by a computer for performing operations that can include, receiving a signal associated with a failure of a power plant or a power plant component, determining one or more root causes associated with the failure of the power plant or the power plant component, based at least in part on operational data and training data from one or more power plants, determining a ranking of the one or more root causes associated with the failure of the power plant or the power plant component, outputting the ranking via a client device, and based at least in part on the ranking, identifying a repair or replacement strategy for the power plant.

According to another example embodiment of the disclosure, a system for providing an integrated power plant advisor can include a power plant, at least one power plant component, and a controller. The system can also include a memory with instructions executable by a computer for performing operations that can include, receiving a signal associated with a failure of the power plant or the at least one power plant component, determining one or more root causes associated with the failure of the power plant or the at least one power plant component, based at least in part on operational data and training data from one or more power plants, determining a ranking of the one or more root causes associated with the failure of the power plant or the at least one power plant component, outputting the ranking via a client device, and based at least in part on the ranking, identifying a repair or replacement strategy for the power plant or the at least one power plant component.

Other embodiments and aspects of the disclosure will become apparent from the following description taken in conjunction with the following drawings.

BRIEF DESCRIPTION OF THE DRAWINGS

Figure 1:
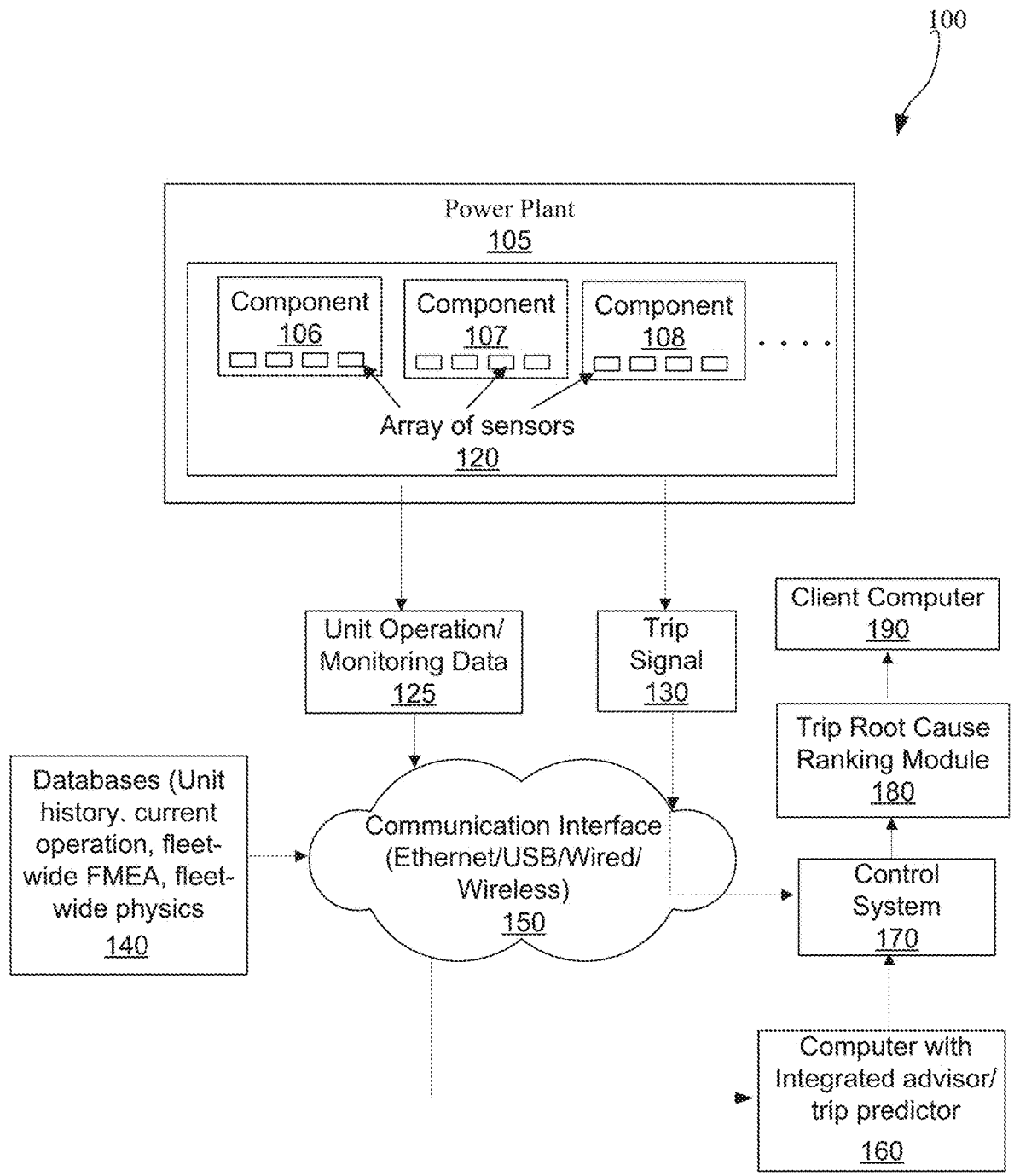

Having thus described the disclosure in general terms, reference will now be made to the accompanying drawings, which are not necessarily drawn to scale, and wherein:

FIG. 1 illustrates an example system environment for providing an integrated power plant advisor in accordance with certain embodiments of the disclosure.

Figure 2:
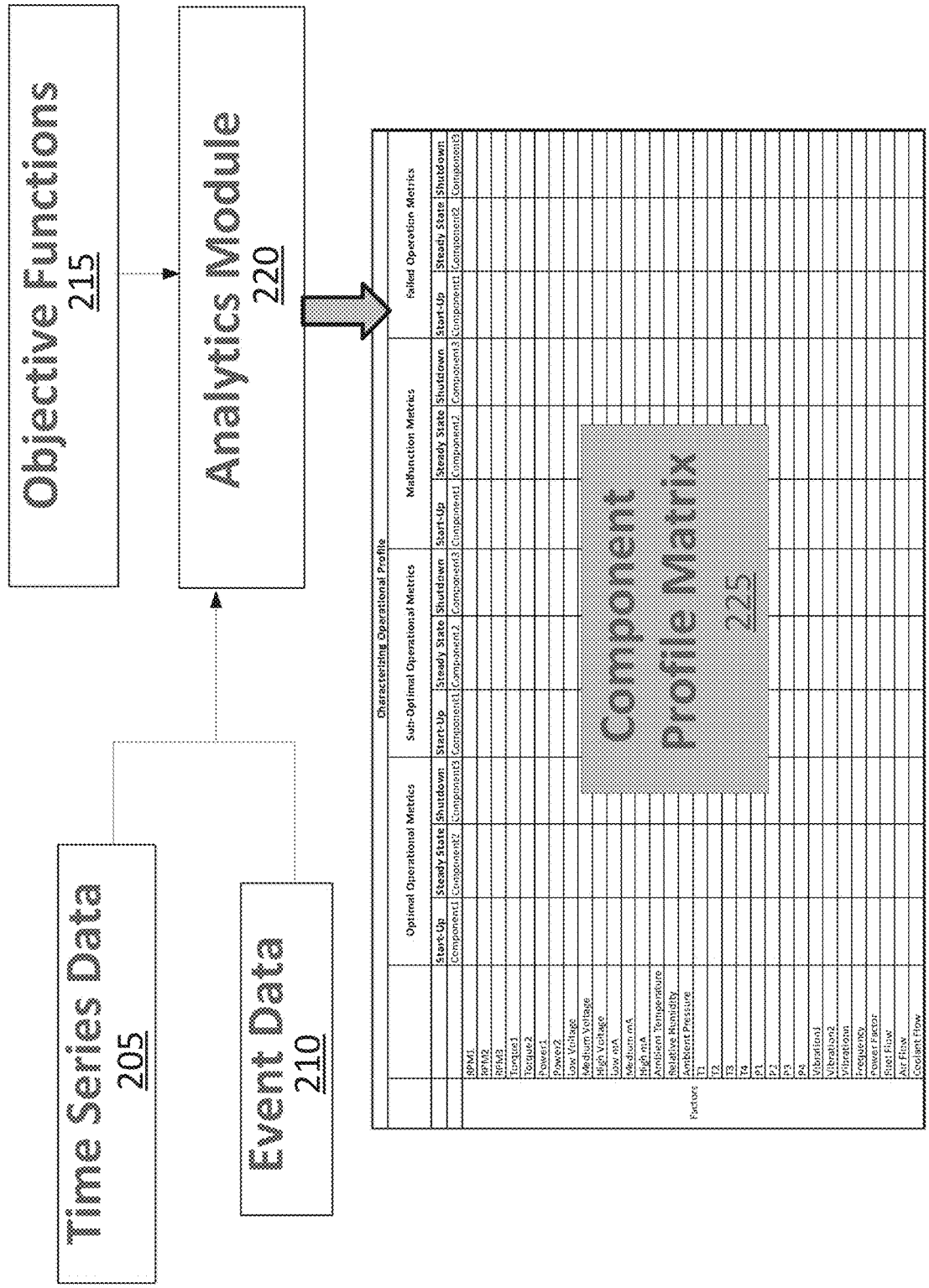

FIG. 2 illustrates an example component profiling sub-system in accordance with certain embodiments of the disclosure.

Figure 3:
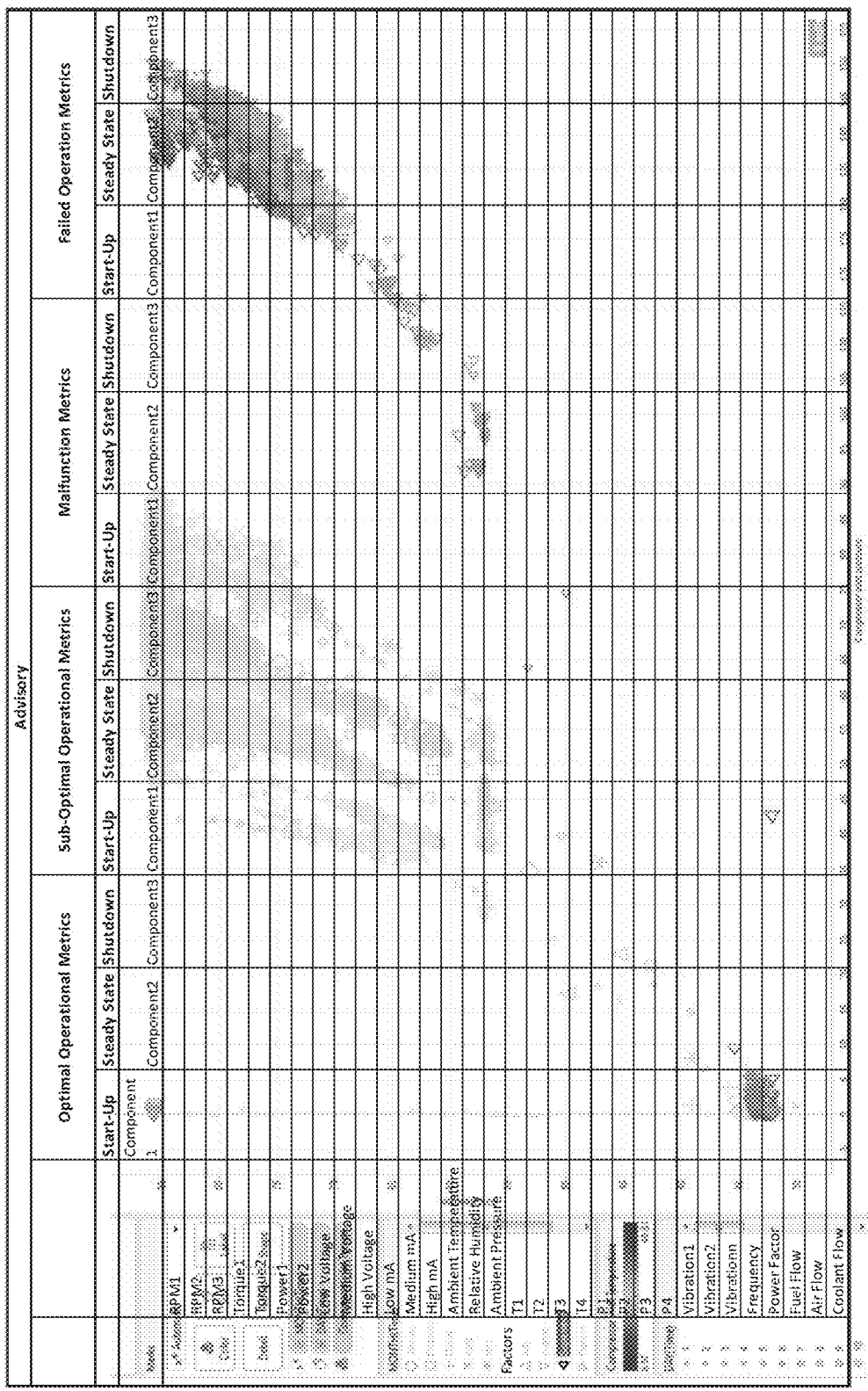

FIG. 3 illustrates an example implementation of an integrated advisor sub-system in accordance with certain embodiments of the disclosure.

Figure 4:
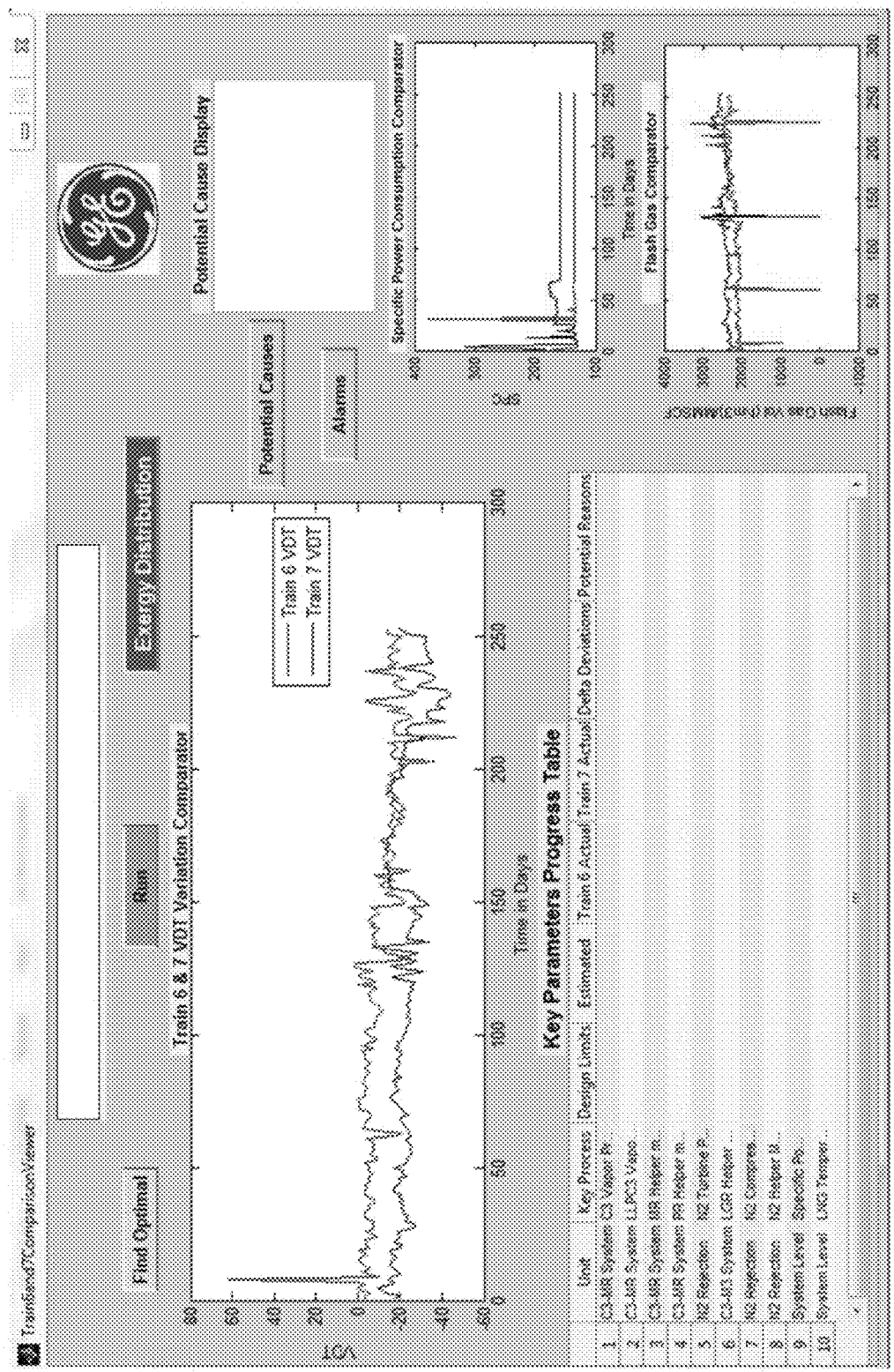

FIG. 4 illustrates an example implementation of a trip root cause predictor sub-system in accordance with certain embodiments of the disclosure.

Figure 5:
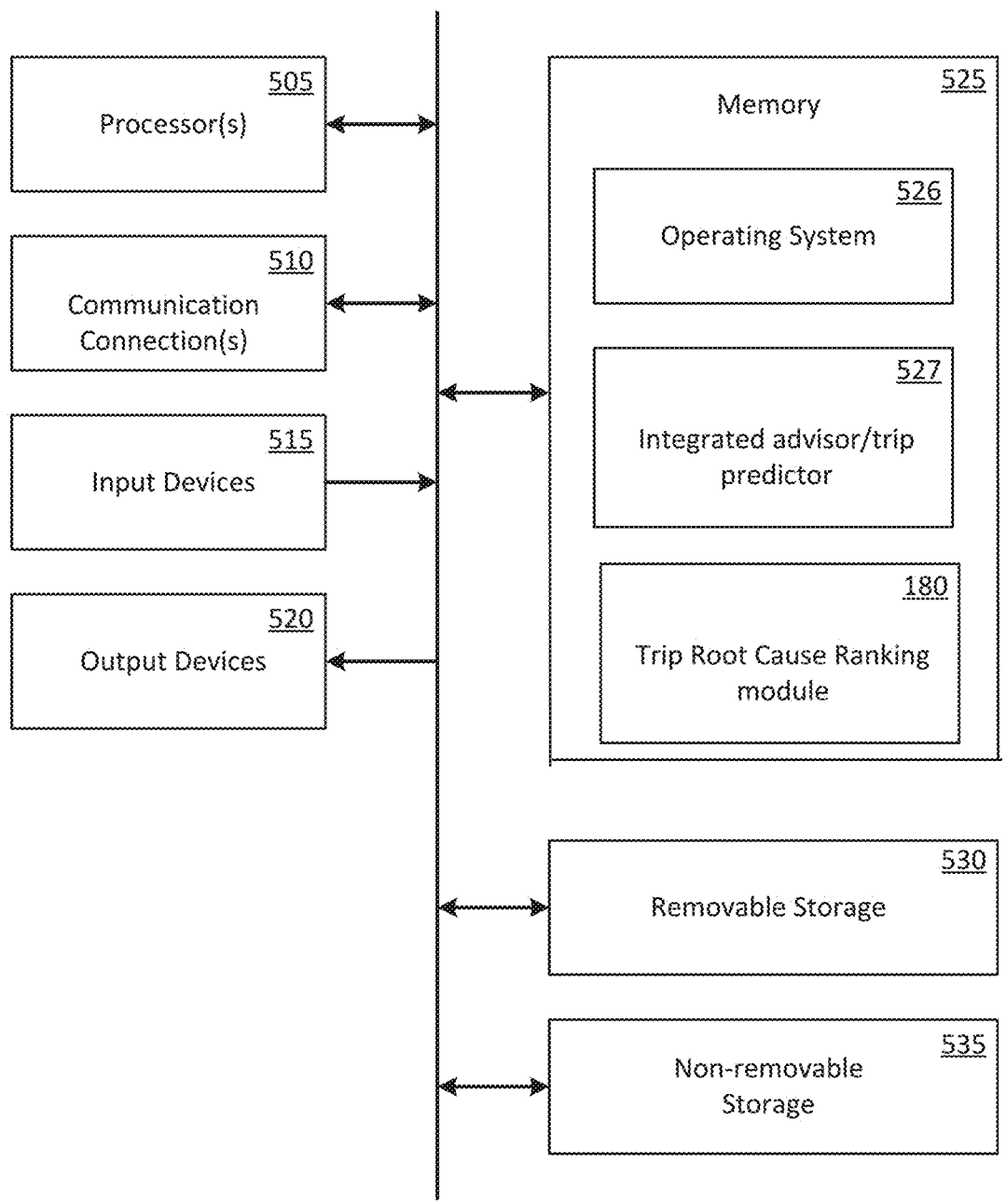

FIG. 5 illustrates an example computer system configured for providing an integrated power plant advisor in accordance with certain embodiments of the disclosure.

Figure 6:
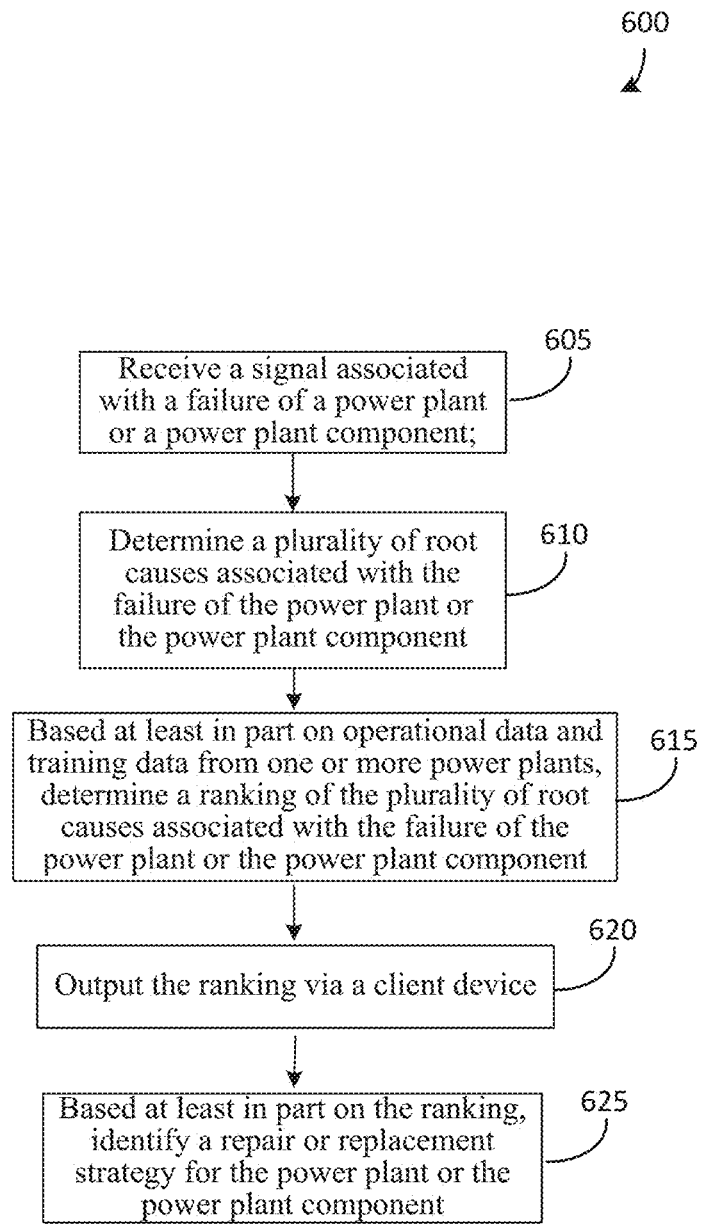

FIG. 6 illustrates an example flowchart of a method for providing an integrated power plant advisor in accordance with certain embodiments of the disclosure.

Figure 7:
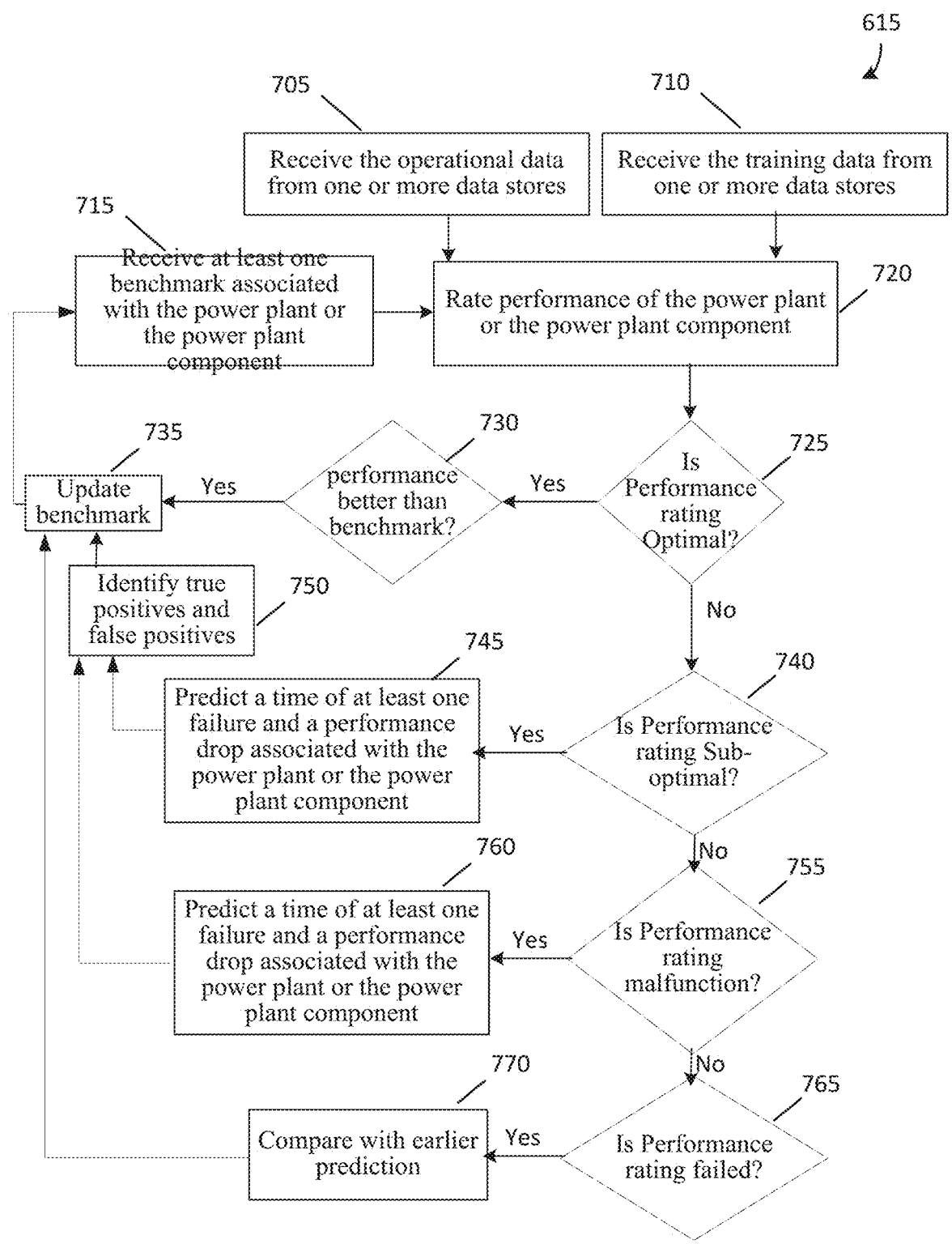

FIG. 7 illustrates another example flowchart of a method for providing an integrated power plant advisor in accordance with certain embodiments of the disclosure.

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. Like numbers refer to like elements throughout.

DETAILED DESCRIPTION

Generally, certain embodiments of the systems and methods described herein are directed to providing an integrated power plant advisor. In some example implementations, certain technical effects and/or solutions can be realized, wherein providing an integrated power plant advisor can result in improvements of system performance and/or reliability. For example, in one embodiment, an integrated power plant advisor may be used to identify inefficiencies in various power plant operations and associated power plant components. Once certain inefficiencies are identified, repair and/or replacement of various power plant components can improve power plant performance and/or reliability.

Referring now to FIG. 1, a block diagram illustrates an example system environment 100 for implementing certain systems and methods for providing an integrated power plant advisor in accordance with an example embodiment. The system environment 100 may include a power plant 105 that can, for example, be a gas turbine combined cycle power plant. The power plant 105 can include one or more power plant components 106, 107, 108, and so forth. The one or more power plant components can include, but may not be limited to, a gas turbine, a gas turbine compressor, a gas turbine combustor, a steam turbine, a pump, a control valve, or a steam drum. The system environment 100, according to an embodiment of the disclosure, can further include an array of sensors 120, an unit operation/monitoring data source 125, a trip signal 130, a set of databases 140, a communication interface 150, a computer 160, a control system 170, a trip root cause ranking module 180, and a client computer 190.

As shown in FIG. 1, the array of sensors 120 can be mounted to the one or more power plant components 106, 107, 108, and so forth in the power plant 105 to provide unit operation/monitoring data 125 and the trip signal 130.

The computer 160 and control system 170 can be communicatively coupled to receive unit operation/monitoring data 125, trip signal 130, and data from the databases 140 via a communication interface 150, which can be any of one or more communication networks such as, for example, an Ethernet interface, a Universal Serial Bus (USB) interface, or a wireless interface. In certain embodiments, the computer 160 and the control system 170 can be coupled to the data stores by way of a hard wire or cable, such as, for example, an interface cable.

The computer 160 can be a computer system having one or more processors that can execute computer-executable instructions to receive and analyze data from the data sources and can include an integrated advisor/trip predictor module. The computer 160 can further provide inputs, gather transfer function outputs, and transmit instructions from any number of operators and/or personnel.

In accordance with an embodiment of the disclosure, a system for providing an integrated power plant advisor may include a power plant 105, at least one power plant component, for example, 106, a controller, for example, the control system 170, and a computer 160 as indicated in FIG. 1. The computer 160 can include a memory that can contain computer-executable instructions capable of receiving a signal, for example, a trip signal 130, associated with a failure of the power plant 105 or the at least one power plant component 106. Based at least in part on the signal, one or more root causes associated with the failure of the power plant 105 or the power plant component 106 can be determined. For example, if the received signal indicates a power plant trip due to high gas turbine exhaust temperature, the possible root causes can be determined. The root causes, for example, can include fuel composition variation, combustor can-to-can flow variation, combustor nozzle issues, and so forth. Based at least in part on operational data and training data from one or more power plants, a ranking of the one or more root causes associated with the failure of the power plant 105 or the at least one power plant component 106 can be determined. Operational data, for example, can be unit operation/monitoring data 125 from the power plant 105, and training data, for example, can be from databases 140 containing history of the power plant 105 or the power plant component 106, fleet-wide failure mode and effects analysis (FMEA), and fleet-wide physics, and so forth, as indicated in FIG. 1. Training data can be based on data from one or more power plants and may represent fleet level statistics.

In an example embodiment, gas turbine operational data gathered from the array of sensors 120 may indicate a high exhaust temperature spread, which may point to a root cause of a combustor can-to-can flow variation. The ranking of the one or more root causes can further be confirmed based on training data, for example, if data from one or more similar power plant indicates a high occurrence of combustor can-to-can flow variation at similar operating life time of the gas turbine, then the combustor can-to-can variation can be assigned a high root cause ranking.

The ranking of the one or more root causes associated with the failure of the power plant 105 or the at least one power plant component 106 can be performed by the trip root cause ranking module 180, or by the control system 170, or by the computer 160. The ranking can be outputted via a client device, for example, the client computer 190 as indicated in FIG. 1. Based at least in part on the ranking, a repair or replacement strategy for the power plant 105 or the at least one power plant component 106 can be identified. For example, if the ranking of the one or more root causes associated with the failure of the power plant 105 indicates combustor nozzle cracking as the highest ranked root cause, an inspection, repair or replacement strategy for the combustor nozzle can be identified. Furthermore, the identified repair or replacement strategy for the power plant 105 or the power plant component 106 can be performed by or otherwise implemented by the control system 170.

The computer 160 can also include software and/or hardware to perform a rapid diagnosis optimization via a deep learning algorithm. The deep learning algorithm can further include an architecture with at least one non-linear transformation. For example, the deep learning algorithm can enable combining time series operational data with discrete data indicating component history to rapidly find an optimum set of ranked root causes. The computer 160 can further provide a trip prediction to the control system 170, from which the control system 170 can perform control actions as well as provide inputs to the trip root cause ranking module 180. In some embodiments, the trip root cause ranking module 180 may be part of the control system 170. In some other embodiments, the computer 160 may determine control actions to be performed based on data received from one or more data sources, for example, from databases 140 or unit operation/monitoring data 125. In other instances, the computer 160 can be an independent entity communicatively coupled to the trip root cause ranking module 180. In other embodiments, the computer 160 and the control system 170 may be a single entity.

Operational data, for example, unit operation/monitoring data 125, can include discrete and time series data. For example, unit operation/monitoring data 125 from the power plant 105 can include time series data such as turbine speed, torque, voltage, pressure, temperature, fuel flow, air flow, and so forth. Training data, for example, from databases 140, can also include discrete and time series data. For example, databases 140 can include time series data such as historical turbine speed, torque, pressure, fuel flow, and so forth. In addition, databases 140 can also include discrete data, for example, FMEA for a fleet of power plants similar to power plant 105.

The determination of ranking of the one or more root causes associated with the failure of the power plant 105 or the at least one power plant component 106 can further include receiving the operational data from one or more data stores, for example, from unit operation/monitoring data 125, and receiving training data from one or more data stores, for example, from databases 140. Based at least in part on the operational data and the training data, at least one failure profile associated with the power plant 105 or the at least one power plant component 106 can be determined. As an example illustration, a failure profile for a power plant component 106, such as a gas turbine transition piece, can be determined as follows. Operational data, for example, gas flow through the transition piece, gas temperature, and so forth, can be combined with training data in the form of event data, which can include fleet wide failure data for the gas turbine transition piece, to determine a failure profile for the gas turbine transition piece. The failure profile for the gas turbine transition piece can indicate, for example, failure history, mean time between failures (MTBF), and so forth. Site specific objective functions can be developed that incorporate transfer functions based on operational data, such as, fuel flow, exhaust gas flow, and so forth. These site specific objective functions can be combined with the failure profile for the gas turbine transition piece in an analytics module to conduct optimization to achieve a particular objective. In the example embodiment above, the optimization objective may be to improve gas turbine performance and/or to reduce gas turbine transition piece failures.

The determination of the at least one failure profile associated with the power plant 105 or the at least one power plant component 106 can further include receiving at least one benchmark associated with the power plant 105 or the at least one power plant component 106. The benchmark associated with each power plant component 106 can be stored in one of the data sources, for example, in databases 140. The benchmark can include data regarding the current operating condition and past performance record of the power plant 105 or the at least one power plant component 106. Based at least in part on the operational data and training data, the performance of the power plant 105 or the power plant component 106 can be rated. The rating of the performance of the power plant 105 or the power plant component 106 can be based on combining and/or comparing the failure profile of the power plant 105 or the power plant component 106 with the benchmark associated with the power plant. For example, in the example gas turbine transition piece illustrated above, the failure profile for the gas turbine transition piece can be compared to a benchmark associated with the gas turbine transition piece for the particular site and at the particular operating hours of the gas turbine transition piece. The benchmark associated with the gas turbine transition can indicate, for example, the current expected performance level of the gas turbine transition piece. For example, if the performance level of the gas turbine transition piece, based on its failure profile, is better than the benchmark, then the performance can be rated as optimal.

The rated performance can include at least one of the following ratings: optimal performance, sub-optimal performance, malfunction performance, or failed performance. Based at least in part on the rated performance, at least one of the following actions can be performed: a time of at least one failure in the power plant 105 or the at least one power plant component 106 can be predicted, the at least one benchmark data associated with the power plant 105 or the at least one power plant component 106 can be updated, a performance drop associated with the power plant 105 or the at least one power plant component 106 can be predicted, or at least one true positive and at least one false positive associated with the rated performance of the power plant 105 or the at least one power plant component 106 can be identified. For example, if the performance of the gas turbine transition piece is rated as sub-optimal performance, a time of failure of the gas turbine transition piece can be predicted based on the failure profile and current operating conditions. The time of failure can be predicted based on several factors, including, for example, mean time between failures (MTBF), hours of operation, and so forth. Furthermore, the drop in plant performance due to sub-optimal performance can be quantified by comparing current plant performance with performance from similar plants operating in similar conditions. In addition, a statistically analysis based on the training data can enable identifying true positives and false positives associated with the rated performance of the example gas turbine transition piece.

In another example embodiment, if the performance of the example gas turbine transition piece in the previous sections is rated optimal, the benchmark data associated with the gas turbine transition piece can be updated with the current optimal performance.

Referring now to FIG. 2, an example component profiling sub-system in accordance with certain embodiments of the disclosure is illustrated. As indicated in FIG. 2, time series data 205, which can be a sub-set of the unit operational/ monitoring data 125 in FIG. 1, can be combined with event data 210, which can be a sub-set of the databases 140, to determine a component profile matrix 225 of the power plant 105 or the at least one power plant component 106. The time series data 205 can include various operating parameters from the power plant, such as, for example, vibration, temperature, current, voltage, RPM, torque, gas turbine power, pressure, relative humidity, air flow, fuel flow, fuel heating value, grid frequency, power factor, gear ratio, or field inspection reports. Event data 210 can include, for example, malfunction and failure data, root cause analysis (RCA) data, component start and stop dates, failure modes, or failure event type. Additionally, the time series data 205 and event data 210 can be fed into an analytics module 220 that further incorporates objective functions 215 for site specific parameters from the power plant 105 or the at least one power plant component 106. The objective functions 215 can include data from one of the data sources, and can include, for example, regression functions representing gas turbine or power plant power, heat rate, turbine firing temperature, turbine down time, stresses, and so forth of various power plant components 106. Objective functions 215 can be used for optimization of certain site parameters, for example, if volumetric downtime is identified as the primary objective function, the volumetric downtime can be minimized in order to ensure better system performance and to reduce failures. Based on the time series data 205, event data 210, and objective functions 215, the analytics module 220 can rate the performance of the power plant 105 or the power plant component 106 in one of several ratings, such as, for example, optimal performance, sub-optimal performance, malfunction performance, or failed performance. Based on this rating, an N-way interaction matrix can be created, such as the component profile matrix 225 shown in FIG. 2. The example component profile matrix 225 can include various power plant components 106 in various operational modes of the power plant, for example, in a start-up operation, steady state operation or a shutdown operation along with various operational characteristics of the power plant component 106, such as, for example, its speed, torque, vibration, temperature, and so forth.

As an illustrative example of the sub-system described in FIG. 2, a power plant component 106, for example, a motor, can be evaluated for various operating parameters, for example, motor vibration, motor bearing temperature, and variable frequency drive (VFD) of the motor, which can be captured by the analytics module 220 and assigned to the component profile matrix 225. For example, the analytics module 220 can further compute time to failure for vibration and can access the training data associated with the motor to infer a sub-component of the motor that can cause performance malfunction due to vibration. In certain embodiments, based on applying various rules of association and exception to the operational and training data, the variable frequency drive (VFD) can be identified as the probably root cause of the performance malfunction due to vibration.

FIG. 3 illustrates an example implementation of an integrated advisor sub-system in accordance with certain embodiments of the disclosure. As shown in FIG. 3, based on the operational time series data 205, event data 210 and objective functions 215, example power plant components 1, 2, and 3 can be placed in an N-way interaction matrix in three example operational modes, for example, start-up mode, steady state mode or shutdown mode and in one of several ratings, such as, for example, optimal operational metrics, sub-optimal operational metrics, malfunction metrics and failed operation metrics. As indicated in the example implementation in FIG. 3, component 2 can have a failed operation metrics for one or more operational parameter, such as, for example, turbine speed in RPM or turbine power.

Referring now to FIG. 4, an example implementation of a trip root cause predictor sub-system is illustrated in accordance with certain embodiments of the disclosure. As illustrated in FIG. 4, various input parameters in a key parameters progress table are compared with data from one or more data stores to identify a potential root cause of a failure event, for example, a trip.

Attention is now drawn to FIG. 5, which illustrates an example computer system 160 configured for implementing certain systems and methods for an integrated power plant advisor for system performance and reliability in accordance with certain embodiments of the disclosure. The computer system can include a processor 505 for executing certain operational aspects associated with implementing certain systems and methods for an integrated power plant advisor for system performance and reliability in accordance with certain embodiments of the disclosure. The processor 505 can be capable of communicating with a memory 525. The processor 505 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 525 and executed by the processor 505.

The memory 525 can be used to store program instructions that are loadable and executable by the processor 505 as well as to store data generated during the execution of these programs. Depending on the configuration and type of the computer system 160, the memory 525 can be volatile (such as random access memory (RAM)) and/or non-volatile (such as read-only memory (ROM), flash memory, etc.). In some embodiments, the memory devices can also include additional removable storage 530 and/or non-removable storage 535 including, but not limited to, magnetic storage, optical disks, and/or tape storage. The disk drives and their associated computer-readable media can provide non-volatile storage of computer-readable instructions, data structures, program modules, and other data for the devices. In some implementations, the memory 525 can include multiple different types of memory, such as static random access memory (SRAM), dynamic random access memory (DRAM), or ROM.

The memory 525, the removable storage 530, and the non-removable storage 535 are all examples of computer-readable storage media. For example, computer-readable storage media can include volatile and non-volatile, removable and non-removable media implemented in any method or technology for storage of information such as computer-readable instructions, data structures, program modules or other data. Additional types of computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Computer system 160 can also include one or more communication connections 510 that can allow a control device (not shown) to communicate with devices or equipment capable of communicating with the computer system 160. The communication connection(s) 510 can include communication interface 150. The control device can include the control system 170. Connections can also be established via various data communication channels or ports, such as USB or COM ports to receive cables connecting the control device to various other devices on a network. In one embodiment, the control device can include Ethernet drivers that enable the control device to communicate with other devices on the network. According to various embodiments, communication connections 510 can be established via a wired and/or wireless connection on the network.

The computer system 160 can also include one or more input devices 515, such as a keyboard, mouse, pen, voice input device, gesture input device, and/or touch input device. It can further include one or more output devices 520, such as a display, printer, and/or speakers.

In other embodiments, however, computer-readable communication media can include computer-readable instructions, program modules, or other data transmitted within a data signal, such as a carrier wave, or other transmission. As used herein, however, computer-readable storage media do not include computer-readable communication media.

Turning to the contents of the memory 525, the memory 525 can include, but is not limited to, an operating system (OS) 526 and one or more application programs or services for implementing the features and aspects disclosed herein. Such applications or services can include an integrated advisor/trip predictor 527 for executing certain systems and methods for providing an integrated power plant advisor for a power plant 105 and at least one power plant component 106. A trip root cause module 180 can reside in the memory 525 or can be independent of the computer system 160. In one embodiment, the integrated advisor/trip predictor 527 can be implemented by software that is provided in configurable control block language and is stored in non-volatile memory. When executed by the processor 605, the integrated advisor/trip predictor 527 can implement the various functionalities and features associated with the computer system 160 described in this disclosure.

FIG. 6 illustrates an example flowchart 600 of a method for providing an integrated power plant advisor according to at least one embodiment of the disclosure. The flowchart 600 represents a series of operations that can be executed by the interaction of the various functional blocks shown in FIGS. 1, 2, and/or 5. More particularly, the flowchart 600 includes a block 605 representing an operation to receive a signal associated with a failure of a power plant 105 or a power plant component 106. In block 610, one or more root causes associated with the failure of the power plant 105 or the power plant component 106 can be determined. In block 615, based at least in part on operational data and training data from one or more power plants, a ranking of the one or more root causes associated with the failure of the power plant 105 or the power plant component 106 can be determined. In block 620, the ranking can be outputted via a client device, for example, the client computer 190 of FIG. 1. In block 625, based at least in part on the ranking, a repair or replacement strategy for the power plant 105 or the power plant component 106 can be identified.

FIG. 7 illustrates another example flowchart to further elaborate block 615 of FIG. 6 to illustrate a method for providing an integrated power plant advisor according to at least one embodiment of the disclosure. In block 705, operational data from one or more data sources, for example, unit operational/monitoring data 125 of FIG. 1, can be received. In block 710, training data can be received, for example, from databases 140 of FIG. 1. In block 715, at least one benchmark associated with the power plant 105 or the power plant component 106 can be received from one or more data sources. In block 720, based at least in part on the received operational data 705, training data 710 and the at least one benchmark 715 associated with the power plant 105 or the power plant component 106, the performance of the power plant 105 or the power plant component 106 can be rated.

Decision block 725 illustrates one rating choice, for example, an optimal rating. If the performance rating in block 725 is optimal, block 730 is a decision block to determine if the performance is better than the benchmark 715. If the performance is better than the benchmark 715, in block 735, the benchmark 715 can be updated to reflect a new benchmark. Decision block 740 illustrates another rating choice, for example, a sub-optimal rating. If the performance is rated sub-optimal, in block 745, a time of at least one failure and a performance drop associated with the power plant 105 or the power plant component 106 can be predicted. Additionally, in block 750, true positives and false positive predictions can be identified, and in block 735, the benchmark 715 can be updated to reflect the rated performance. Decision block 755 illustrates yet another performance rating choice, for example, a malfunction rating. If the performance is rated as malfunction, in block 760, a time of at least one failure and a performance drop associated with the power plant 105 or the power plant component 106 can be predicted. Additionally, in block 750, true positives and false positive predictions can be identified, and in block 735, the benchmark 715 can be updated to reflect the rated performance. Finally, decision block 765 illustrates an example failed performance rating. If the performance is rated as failed, in block 770, the performance can be compared with earlier predictions, and the benchmark 715 can be updated with the new performance rating.

References are made herein to block diagrams of systems, methods, and computer program products according to example embodiments of the disclosure. It will be understood that at least some of the blocks of the block diagrams, and combinations of blocks in the block diagrams, respectively, can be implemented at least partially by computer program instructions. These computer program instructions can be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions can also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions can also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein can be implemented through an application program running on an operating system of a computer. They also can be practiced with other computer system configurations, including hand-held devices, multiprocessor systems, microprocessor based, or programmable consumer electronics, mini-computers, mainframe computers, etc.

Application programs that are components of the systems and methods described herein can include routines, programs, components, data structures, etc. that implement certain abstract data types and perform certain tasks or actions. In a distributed computing environment, the application program (in whole or in part) can be located in local memory, or in other storage. In addition, or in the alternative, the application program (in whole or in part) can be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method comprising:
   determining root causes associated with a failure of a power plant or the power plant component;
   based at least in part on operational data and training data from one or more power plants, determining a ranking of the root causes associated with the failure of the power plant or the power plant component, wherein determining a ranking of the root causes comprises performing a rapid diagnosis optimization with a deep learning algorithm, wherein the deep learning algorithm comprises at least one nonlinear transformation to combine time series operational data with discrete data indicating component history;
   outputting the ranking via a client device;

based at least in part on the ranking, identifying a repair or replacement strategy for the power plant or the power plant component; and performing, via a control system, a control action comprising the identified repair or replacement strategy, wherein the control action actuates a gas turbine, gas turbine compressor, gas turbine combustor, steam turbine, pump, control valve, or steam drum.

2. The method of claim 1, wherein determining a ranking of the root causes comprises:

receiving the operational data from one or more data stores;

receiving the training data from one or more data stores; and based at least in part on the operational data and the training data, determining at least one failure profile associated with the power plant or the power plant component.

3. The method of claim 1, wherein determining the at least one failure profile associated with the power plant or the power plant component comprises:

receiving at least one benchmark associated with the power plant or the power plant component; and based at least in part on the operational data and training data, rating performance of the power plant or the power plant component.

4. The method of claim 3, wherein the rated performance comprises at least one of the following ratings: optimal performance, sub-optimal performance, malfunction performance, or failed performance.

5. The method of claim 3, further comprising:

based at least in part on the rated performance, performing at least one of:

predicting a time of at least one failure in the power plant of the power plant component;

updating the at least one benchmark data associated with the power plant or the power plant component; and predicting a performance drop associated with the power plant or the power plant component.

6. A system comprising:

a controller; and a memory comprising computer-executable instructions, the instructions executable by the controller, and the instructions operable to:

determine root causes associated with a failure of the power plant or a power plant component;

based at least in part on operational data and training data from one or more power plants, determine a ranking of the root causes associated with the failure of the power plant or the power plant component, wherein determine a ranking of the root causes comprises performing a rapid diagnosis optimization with a deep learning algorithm, wherein the deep learning algorithm comprises at at least one non-linear transformation to combine time series operational data with discrete data indicating component history;

output the ranking via a client device;

based at least in part on the ranking, identify a repair or replacement strategy for the power plant; and perform, via the controller, a control action comprising the identified repair or replacement strategy, wherein the control action actuates a gas turbine, gas turbine compressor, gas turbine combustor, steam turbine, pump, control valve, or steam drum.

7. The system of claim 6, wherein the computer-executable instructions operable to determine a ranking of the root causes comprises computer-executable instructions operable to:

receive the operational data from one or more data stores;

receive the training data from one or more data stores; and based at least in part on the operational data and the training data, determine at least one failure profile associated with the power plant component.

8. The system of claim 7, wherein the computer-executable instructions operable to determine at least one failure profile associated with the power plant or the power plant component comprises computer-executable instructions operable to:

receive at least one benchmark associated with the power plant or the power plant component; and based at least in part on the operational data and training data, rate performance of the power plant or the power plant component.

9. The system of claim 8, wherein the rated performance comprises at least one of the following ratings: optimal performance, sub-optimal performance, malfunction performance, or failed performance.

10. The system of claim 8, wherein the computer-executable instructions are further operable to:

based at least in part on the rated performance, perform at least one of:

predict a time of at least one failure in the power plant or the power plant component;

update the at least one benchmark data associated with the power plant or the power plant component; and predict a performance drop associated with the power plant or the power plant component.

11. A system comprising:

a power plant;

at least one power plant component; a controller; and a memory comprising computer-executable instructions, the instructions executable by the controller, and the instructions operable to:

determine root causes associated with a failure of the power plant or at least one power plant component, wherein determine the root causes comprises performing a rapid diagnosis optimization with a deep learning algorithm to rank the root causes, wherein the deep learning algorithm comprises at least one non-linear transformation to combine time series operational data with discrete data indicating component history;

based at least in part on operational data and training data from one or more power plants, determine a ranking of the root causes associated with the failure of the power plant or the at least one power plant component;

output the ranking via a client device;

based at least in part on the ranking, identify a repair or replacement strategy for the power plant or the at least one power plant component; and perform, via the controller, a control action comprising the identified repair or replacement strategy, wherein the control action actuates a gas turbine, gas turbine compressor, gas turbine combustor, steam turbine, pump, control valve, or steam drum.

12. The system of claim 11, wherein the computer-executable instructions operable to determine a ranking of the root causes comprises computer-executable instructions operable to:

receive the operational data from one or more data stores;

receive the training data from one or more data stores; and based at least in part on the operational data and the training data, determine at least one failure profile associated with the power plant or the at least one power plant component.

13. The system of claim 12, wherein the computer-executable instructions operable to determine at least one failure profile associated with the power plant or the at least one power plant component comprises computer-executable instructions operable to:
receive at least one benchmark associated with the power plant or the at least one power plant component; and
based at least in part on the operational data and training data, rate performance of the power plant or the at least one power plant component.

14. The system of claim 13, wherein the computer-executable instructions are further operable to:
based at least in part on the rated performance, perform at least one of:
predict a time of at least one failure in the power plant or the at least one power plant component;
update the at least one benchmark data associated with the power plant or the at least one power plant component; and
predict a performance drop associated with the power plant or the at least one power plant component.

* * * * *